United States Patent [19]

Timlin

[11] Patent Number: 4,800,942

[45] Date of Patent: Jan. 31, 1989

[54] PORTABLE TIRE CHANGING STAND

[76] Inventor: Patrick M. Timlin, P.O. Box 297, Justin, Tex. 76247

[21] Appl. No.: 4,073

[22] Filed: Jan. 16, 1987

[51] Int. Cl.⁴ .............................................. B60C 25/08
[52] U.S. Cl. ..................................... 157/1.24; 157/21
[58] Field of Search .................... 157/1.22, 1.24, 1.1, 157/1, 1.17, 1.3, 14

[56] References Cited

U.S. PATENT DOCUMENTS

| | | | |
|---|---|---|---|
| 3,038,528 | 6/1962 | Cunningham | 157/1.24 |
| 3,255,800 | 6/1966 | Strang et al. | |
| 3,474,840 | 10/1969 | Scott | 157/1.24 |
| 3,490,512 | 1/1970 | Ghyselinck | 157/1.24 |
| 3,685,565 | 8/1972 | Sorenson et al. | 157/1 |
| 4,381,028 | 4/1983 | Patig | 157/1.22 |

FOREIGN PATENT DOCUMENTS 163712 12/1948 Fed. Rep. of Germany ..... 157/1.24

Primary Examiner—Frederick R. Schmidt
Assistant Examiner—Robert Showalter
Attorney, Agent, or Firm—Charles D. Gunter, Jr.

[57] ABSTRACT

A Tire Changing Stand is shown having a base which includes a wheel rim supporting surface which is arranged in a plane generally parallel to the ground. A dome-shaped enclosure slopes evenly away from the wheel rim supporting surface toward the ground to define an open interior. A hydraulic power unit and hydraulic motor are contained within the open interior of the base. The hydraulic motor has an output shaft which terminates in a coupling for a tool driving extension. The output shaft is arranged in the base interior generally perpendicular to the plane of the rim supporting surface. The length of the shaft is selected so that the coupling does not extend above the plane of the rim supporting surface.

8 Claims, 2 Drawing Sheets

PORTABLE TIRE CHANGING STAND

BACKGROUND OF THE INVENTION

1. Field of the Invention

This invention relates to a tire changing stand and more particularly to one which is powered for the purpose of breaking loose tires from wheel rims and also powered for revolving a tool to mount as well as demount a tire from the rim.

2. Description of the Prior Art

Tire changing stands having a center post for receiving a wheel rim are known in the art. For example, U. S. Pat. No. 3,685,565, issued Aug. 22, 1972 to Sorenson et al., shows such a stand. In the prior art stands, the wheel rim receiving surface is typically provided with an upstanding post over which the wheel rim is impaled when the rim and tire are placed on the receiving surface. In some cases, the post is threaded so that a clamp member can be engaged thereon and used to clamp the rim to the stand following the placement of the rim and tire onto the rim receiving surface.

Other prior art tire stands have featured rim engaging members which were offset from the center post and which engaged the tire rim at one or more locations about the rim periphery. The introduction of special or decorative wheel rims, such as those made of magnesium, aluminum, or using non-metallic material for decorative purposes, has created problems with respect to performing the tire servicing function without marring or otherwise harming the decorative rims. For example, holding a rim of magnesium on the tire changing stand by a threaded clamp member can result in gouging or otherwise marring the surface of the rim in the area immediately adjacent to clamping member.

In addition to the problem of marring decorative rims, many of the prior art tire changing stands were extremely complicated and bulky, making them unsuitable for portable use. As a result, it was not possible to use the units in the field at the location of a break down. Also, the fixed center post and base design of certain of the prior art designs made it extremely difficult to maneuver the wheel and rim into position on the stand. In particular, it was necessary to raise the wheel and tire over the center post to impale the tire. Since a large truck tire and rim can weigh in excess of 150 pounds, a great deal of effort was required.

The present invention has as its object the provision of a portable tire changing stand which is simple in design, light weight, and economical to manufacture.

Another object of the invention is the provision of such a tire changing stand which can be easily transported to the location of a breakdown on a highway or other field location.

Another object of the invention is the provision of a tire changing stand which can be operated without danger of damaging decorative rims and which has a shape and operation to facilitate handling large diameter tires and rims.

SUMMARY OF THE INVENTION

The tire changing stand of the invention is positionable on the ground at a break down site for receiving and holding rims of different diameters. The stand has a base which includes a wheel rim supporting surface which is arranged in a plane generally parallel to the ground. The remainder of the base comprises a dome-shaped enclosure which slopes evenly away from the wheel rim supporting surface toward the ground to define an open interior. A hydraulic power unit and hydraulic motor are contained within the open interior of the base. The hydraulic motor has an output shaft which terminates in a coupling for a tool driving extension. The output shaft is arranged in the base interior generally perpendicular to the plane of the rim supporting surface. The length of the shaft is selected so that the coupling does not extend above the plane of the rim supporting surface.

The dome-shape of the base and the absence of a fixed center post facilitate maneuvering large tires and rims onto the rim's supporting surface. The rim can be connected to the supporting surface by passing two or more pins through the bolt receiving openings in the wheel rim and into aligned openings provided in the supporting surface of the base. An installation or removal tool is attached to the tool driving extension and is rotated thereby about the periphery of the wheel rim for making up or breaking out a tire.

Additional objects, features and advantages will be apparent in the written description which follows.

DETAILED DESCRIPTION OF THE INVENTION

Figure 1:
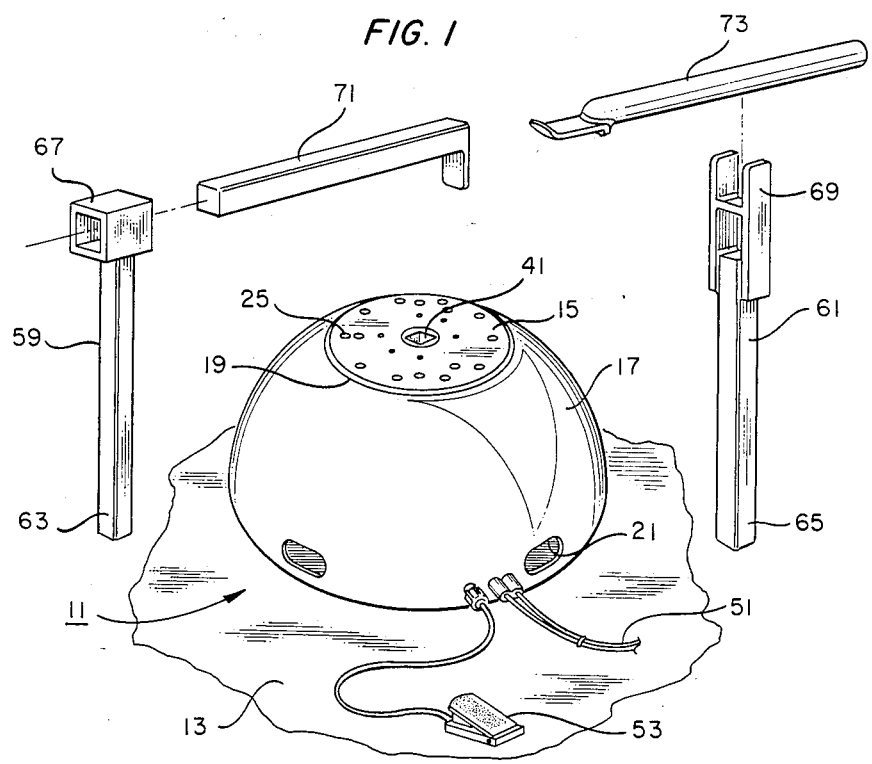
FIG. 1 is perspective view of the tire changing stand of the invention showing the base, tool driving extensions, and tire changing tools which are used with the stand.

FIG. 1 shows a tire changing stand, designated generally as 11. The stand 11 is positionable on the ground 13 at a breakdown site, such as the location of a truck on a highway, for receiving and holding wheel rims of different diameters.

The base includes a disk-shaped wheel rim supporting surface 15 which is arranged in plane generally parallel to the ground 13. The remainder of the base comprises a dome-shaped enclosure 17 which slopes evenly away on all sides from the outer circumferential extent 19 of the supporting surface 15. As shown in FIG. 1, the dome-shaped enclosure extends all the way from the supporting surface 15 to the ground 13, thereby defining an open interior 21 within the base.

Figure 2:
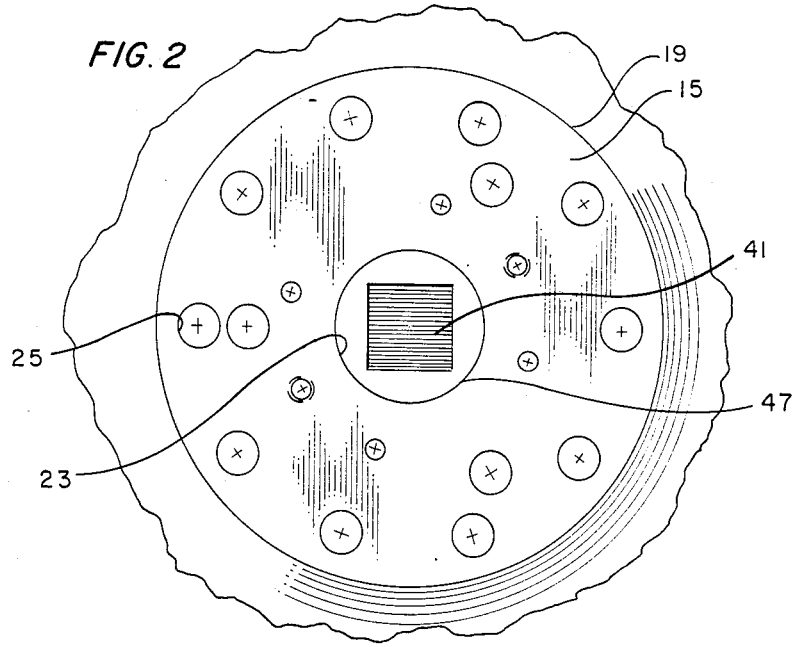
FIG. 2 is a partial, top view of the base showing the wheel supporting surface thereof.

FIG. 2 is a top view of the wheel rim supporting surface 15 showing a central aperture 23 and a plurality of pin receiving openings 25 which are spaced about the central aperture 23. The openings 25 are arranged in a pattern for registration with at least two of the bolt receiving openings 27 (FIG. 3) of the vehicle rim 29. The pattern of pin receiving openings shown in FIG. 2 can be used to accommodate wheel rims of different diameters without the necessity of an adapter plate. By using the bolt receiving openings 27 and pins 31 (FIG. 3), the rim can be engaged on the base without danger of marring special or decorative rims.

Figure 3:
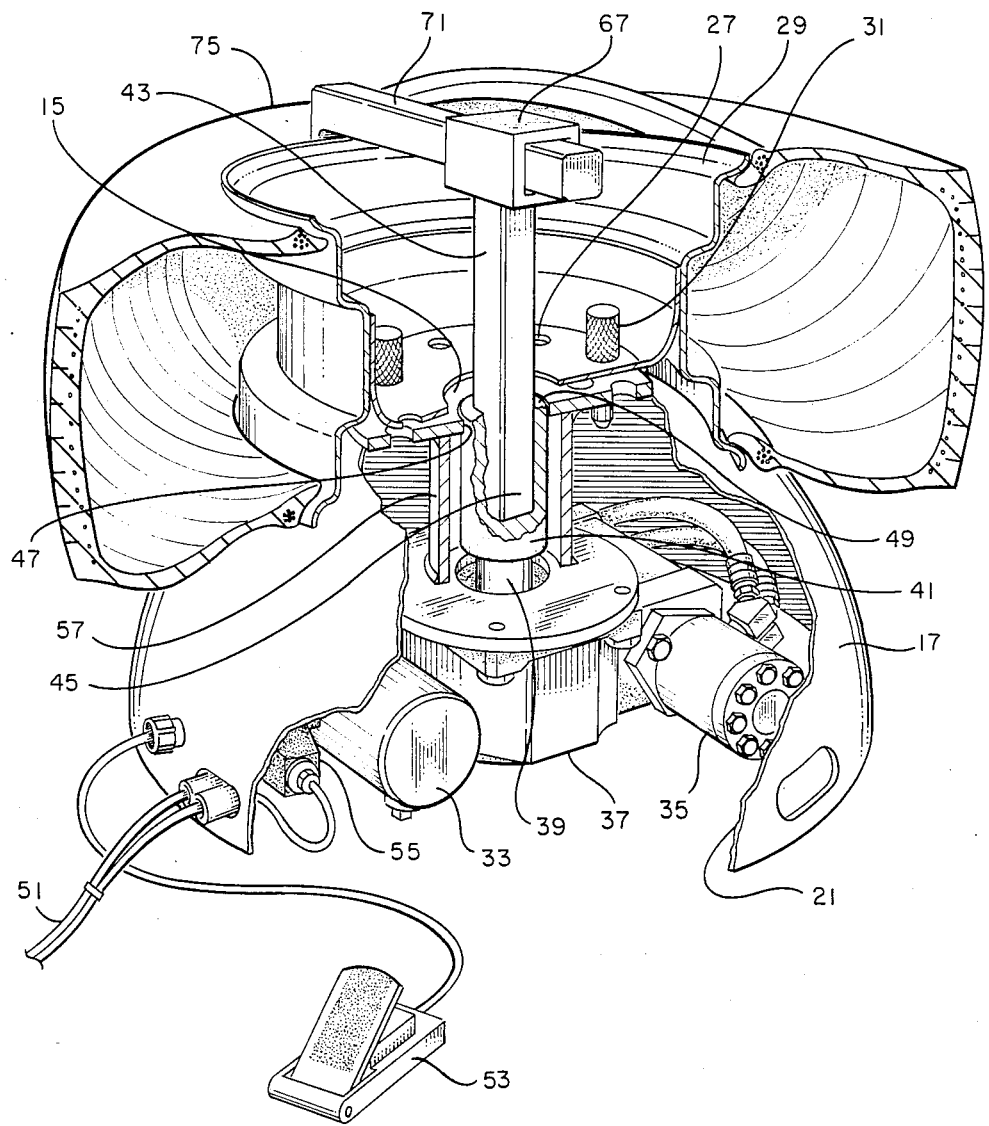
FIG. 3 is a cut-away, prospective view of the base with a tire and wheel mounted thereon and showing the installation tool being rotated by the tool driving extension.

As shown in FIG. 3, the open interior 21 of the base 17 contains a hydraulic power unit 33 and a companion hydraulic motor 35. A suitable hydraulic power unit 33 is commercially available from W. W. Grainger, Inc., as the "Dayton" number 4Z339 automatic power unit. A suitable hydraulic motor 35 and a gear box 37 are commercially available as a unit from the Charlyn Corporation as the series 003 worm gear speed reducer and motor.

The gear box 37 has an output shaft 39 which is driven by the hydraulic motor 35 and terminates in a female coupling 41 for a tool driving extension 43. The female coupling 41 is preferably provided with a square recess for engaging the square end 45 of the tool driving extension 43.; As seen in FIG. 3, the output shaft 39 is arranged in the base interior 21 generally perpendicular to the plane of the rim supporting surface 15. The coupling 41 is aligned with a central aperture 47 provided in the rim supporting surface 15 and the length of the shaft 39 is selected so that the coupling 41 does not extend above the plane of the wheel rim supporting surface 15. Preferably, the outer extent 49 of the coupling 41 is either recessed within the aperture 47 or is flush with the wheel rim supporting surface 15.

The Dayton number 4Z339 hydraulic power unit 33 is powered from a 12 volt battery source (not shown) through the battery cables 51. Any 12 volt battery can be used, such as the battery used by the vehicle engine. The hydraulic power unit 33 comes equipped with a foot pedal 53 which controls a solenoid valve 55 for powered operation of double acting hydraulic cylinders, the position of the solenoid valve being used to control the direction of flow of the hydraulic output shaft. The hydraulic power unit and hydraulic motor 33, 35 are secured within the base interior 21 by means of a tubular, flange 57 which extends from the gear box 37 to the underside of the wheel rim support surface 15 and which surrounds the output shaft 39.

Each of the tool driving extensions 59, 61 has a square end 63, 65 which is adapted to be engaged by the female coupling 41 of the hydraulic motor output shaft. Each extension has a latch end 67, 69. The latch end 67 is adapted to receive one end of an installation tool 71 of the type used in the industry. The latch end 69 of the other extension 61 is adapted to engaged a tire removal tool 73 of the type familiar to those in the industry.

The operation of the invention will be described with reference to FIG. 3. In FIG. 3, a tire 75 has been maneuvered onto rim supporting surface 15 and the pins 31 have been passed through the bolt receiving openings 27 of the rim and into the aligned openings 25 in the supporting surface 15. After the tire is in position, the tool driving extension. 43 is inserted within the female coupling 41 and the hydraulic power unit 33 is actuated by means of the foot pedal 53. The power unit 33 causes the hydraulic motor 35 to rotate the output shaft 39 which, in turn, rotates the tool driving extension 43 and installation tool 71 about the periphery of the rim 29 to mount the tire upon the rim 29. The solenoid control of the power unit 33 allows the direction of rotation to be reversed to facilitate the installation procedure where difficulty is encountered. For tire removal, the tool driving extension 61 (FIG. 1) and removal tool 73 are used in similar fashion.

An invention has been provided with several advantages. The tire changing stand of the invention has a dome-shaped base which facilitates maneuvering large tires onto the rim supporting surface. The absence of a fixed center post on the base facilitates maneuvering the tire into position. The recessed coupling from the output shaft is below the level of the wheel rim supporting surface, allowing the tire to be easily positioned upon the supporting surface. By using connecting pins which are received within the bolt receiving openings of the tire rim, damage to decorative rims can be avoided. This also eliminates the necessity of a more complicated and expensive rim engaging mechanism. The unit can be powered from a 12 volt battery and can be provided in a unit which weighs less than 200 pounds for ease of transport to distant locations. A dome-shaped base approximately 14 inches high and 30 inch maximum circumference can accommodate truck tires weighing 150 pounds or more.

While the invention has been shown in only one of its forms, it is not thus limited but is susceptible to various changes and modifications without departing from the spirit thereof.

I claim:

1. A portable tire changing stand which is positionable on the ground at a breakdown site for receiving and holding wheel rims of different diameters, comprising:

a base which includes a wheel rim supporting surface having a central aperture, the rim supporting surface being arranged in a plane generally parallel to the ground, the remainder of the base comprising a dome-shaped enclosure which slopes in arcuate fashion evenly away from the wheel rim supporting surface toward the ground and defines an open interior;

a hydraulic motor contained within the open interior of the base, the hydraulic motor having an output shaft which terminates in a coupling for a tool driving extension, the output shaft being arranged in the base interior generally perpendicular to the plane of the rim supporting surface with the coupling aligned with the central aperture, the length of the shaft being selected so that the coupling does not extend through the central aperture above the plane of the rim supporting surface; and wherein the output shaft of the hydraulic motor is provided with a square, female coupling and wherein a tool driving extension is engageable and removable within the coupling, the tool driving extension having a square end which is received within the square, female coupling when the tool driving extension is engaged within the coupling.

2. A portable tire changing stand which is positionable on the ground at a breakdown site for receiving and holding wheel rims of different diameters, the wheel rims having bolt receiving openings for mounting the wheel rims on a vehicle the stand comprising:

a base includes a disk-shaped, wheel rim supporting surface having an outer circumferential extent and a central aperture, the wheel rim supporting surface being arranged in a plane generally parallel to the ground, the remainder of the base comprising a dome-shaped enclosure which slopes in arcuate fashion evenly away on all sides from the outer circumferential extent of the wheel rim supporting surface and which extends from the wheel rim supporting surface to the ground to define an open interior within the base;

a hydraulic motor contained within the open interior of the base, the hydraulic motor having an output shaft which terminates in a coupling for a tool driving extension, the output shaft being arranged in the base interior generally perpendicular to the plane of the rim supporting surface with the coupling being aligned with the central aperture provided in the wheel rim supporting surface, the length of the shaft being selected so that the coupling does not extend through the central aperture above the plane of the wheel rim supporting surface;

wherein the wheel rim supporting surface is provided with a plurality of openings spaced about the central aperture, the openings being arranged in a pattern for registration with at least two of the bolt receiving openings of a vehicle rim; and wherein the output shaft of the hydraulic motor is provided with a square, female coupling and wherein a tool driving extension is engageable and removable within the coupling, the tool driving extension having a square end which is received within the square, female coupling when the tool driving extension is engaged within the coupling.

3. The portable tire changing stand of claim 2, wherein the tool driving extension has a latch end opposite the square end, the latch end being adapted to engage a tire tool for driving the tool in a circumferential path about a wheel rim.

4. The portable tire changing stand of claim 3, wherein the hydraulic motor contained within the base is electrically powered by a 12 volt battery.

5. The portable tire changing stand of claim 4, wherein the hydraulic motor includes a gear box which is driven by the motor for turning the output shaft, the gear box being supported within the interior of the base from the disk shaped wheel rim support surface by means of a flange which extends from the gear box to the support surface and which surrounds the output shaft.

6. The portable tire changing stand of claim 5, wherein the hydraulic motor is powered by a hydraulic power unit containing hydraulic fluid, and wherein the hydraulic power unit is equipped with a foot pedal controlled solenoid valve for powered operation of double acting hydraulic cylinders, the position of the solenoid valve being used to control the direction of flow of the hydraulic fluid and, in turn, the direction of rotation of the output shaft.

7. A method of breaking a tire from a wheel by using a portable tire changing stand which is positionable on the ground at a breakdown site for receiving and holding wheel rims of different diameters, comprising the steps of:

providing a base which includes a wheel rim supporting surface having a central aperture, the wheel rim supporting surface being arranged in a plane generally parallel to the ground, the remainder of the base being provided as a dome-shaped enclosure which slopes in arcuate fashion evenly away from the wheel rim supporting surface toward the ground, thereby defining an open interior;

providing a hydraulic motor within the open interior of the base, the hydraulic motor having an output shaft which terminates in a coupling for a tool driving extension, the output shaft being arranged in the base interior generally perpendicular to the plane of the rim supporting surface with the coupling aligned with the central aperture, the length of the shaft being selected so that the coupling does not extend through the central aperture above the plane of the rim supporting surface;

positioning the tire upon the stand by sliding the tire over the dome shaped enclosure onto the wheel rim supporting surface;

securing the tire to the stand by connecting means which pass between the wheel rim and the wheel rim supporting surface;

thereafter positioning a tool driving extension within the coupling of the extension extends through the central aperture in the rim supporting surface and through an aligned opening in the rim of the tire;

installing a tire removal tool onto the tool driving extension and powering the hydraulic motor to thereby turn the output shaft and, in turn, the tool driving extension and tire removal tool to break the tire from the wheel rim; and wherein the output shaft of the hydraulic motor is provided with a square, female coupling and wherein the tool driving extension is engageable and removable within the coupling the tool driving extension having a square end which is received within the square, female coupling when the tool driving extension is engaged within the coupling.

8. The method of claim 7, wherein the rim is connected to the wheel rim supporting surface by at least two pins which are inserted through the bolt receiving openings of the vehicle rim and through aligned openings provided in the wheel rim supporting surface.

* * * * *